United States Patent [19]

Verboom et al.

[11] 4,325,170

[45] Apr. 20, 1982

[54] DEFLECTION CONTROLLED CYLINDER

[75] Inventors: Hermann Verboom, Kempen; Peter F. Mingers, Willich-Anrath; Valentin Appenzeller, Kempen, all of Fed. Rep. of Germany

[73] Assignee: Eduard Küsters, Krefeld, Fed. Rep. of Germany

[21] Appl. No.: 117,781

[22] Filed: Feb. 1, 1980

[30] Foreign Application Priority Data

Sep. 24, 1979 [DE] Fed. Rep. of Germany ....... 2938580

[51] Int. Cl.³ .................... B21B 13/02; B21B 31/03
[52] U.S. Cl. ................................. 29/116 AD; 29/123
[58] Field of Search ................. 29/113 AD, 116 AD

[56] References Cited

U.S. PATENT DOCUMENTS

| 3,443,295 | 5/1969 | Denoyer et al. | 29/116 AD |
| 3,703,862 | 11/1972 | Appenzeller | 29/116 AD |
| 4,194,446 | 3/1980 | Palovaara | 29/116 AD |
| 4,241,482 | 12/1980 | Biondetti | 29/116 AD |

Primary Examiner—Wayne L. Shedd
Attorney, Agent, or Firm—Kenyon & Kenyon

[57] ABSTRACT

In a deflection controlled cylinder having a hollow cylinder which forms the working cylinder circumference and through which a stationary core extends lengthwise, leaving space all around from the inside circumference of the hollow cylinder, the hollow cylinder being supported on the core with spacing by outer support points of the core, and being supported between the bearings, against the core, by the working pressure of a pressure medium, the controlled cylinder having at least one terminating cover which is provided at one end of the hollow cylinder, surrounds the core in ring fashion and is sealed by sealing arrangements to prevent the escape of oil from the end of the cylinder at its outside and inside circumference, means are provided in the terminating cover enclosing the sealing arrangements for compensating displacements occurring when the core is bent.

11 Claims, 5 Drawing Figures

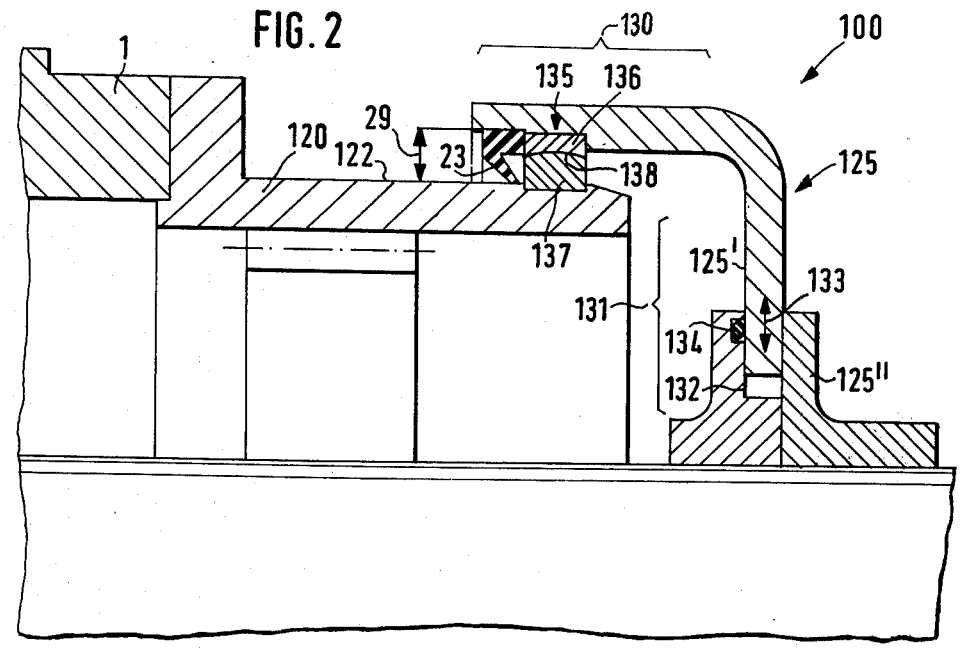
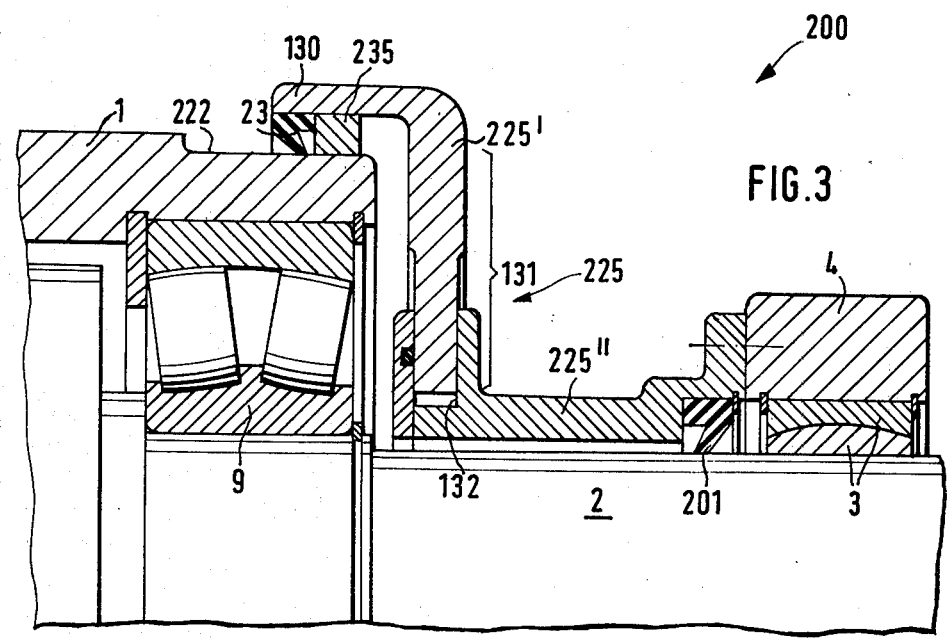

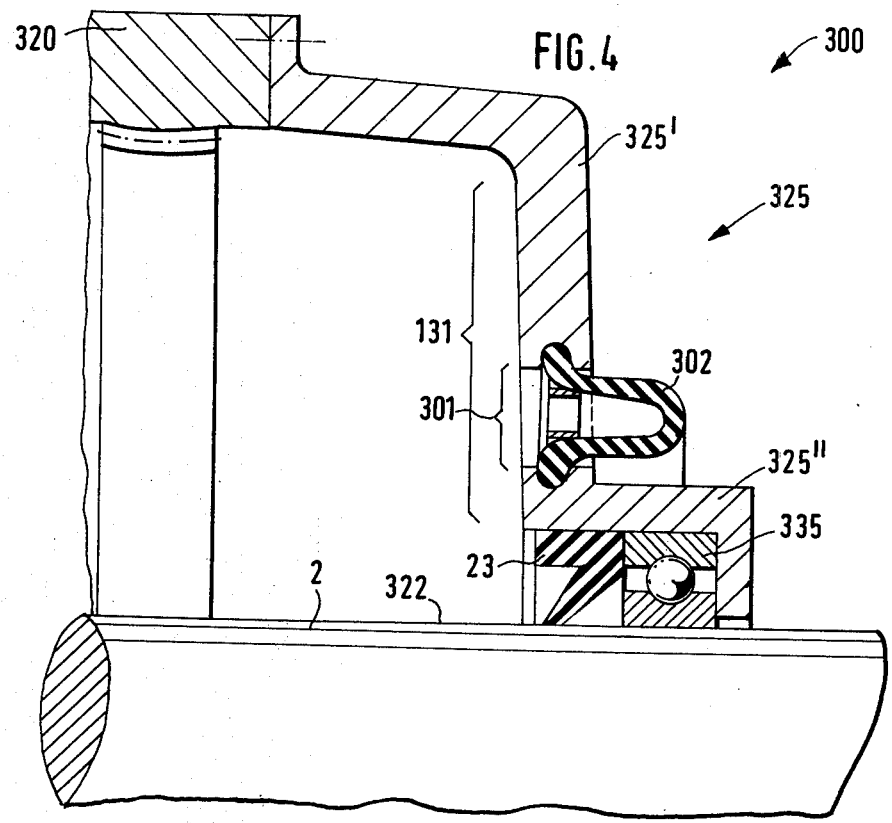
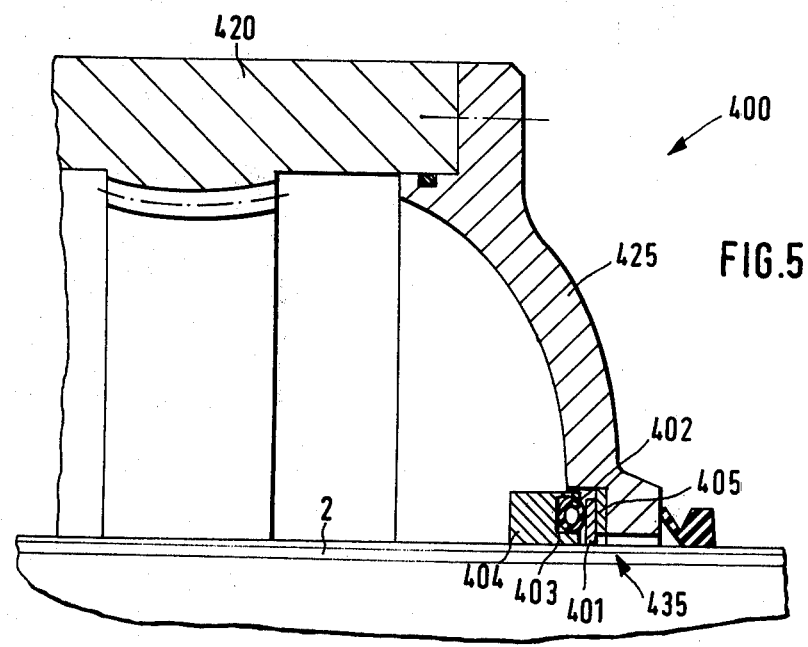

DEFLECTION CONTROLLED CYLINDER

BACKGROUND OF THE INVENTION

This invention relates to press cylinders in general and more particularly to deflection controlled cylinders.

In deflection controlled cylinders a hollow cylinder is usually braced against the forces, at the roller gap where it is opposite another cylinder, which tend to bend the hollow cylinder, by means of a hydraulic medium which is disposed between the hollow cylinder and a core on the side of the gap between the rollers. In a so-called floating cylinder, a longitudinal chamber which can be filled with pressure liquid is established between the hollow cylinder and the core by means of lengthwise seals arranged at about half-height and corresponding transverse seals provided at the ends of the hollow cylinder. The force exerted on the inner circumference of the hollow cylinder can be controlled by controlling the pressure. The force is constant over the length of the longitudinal chamber. The pressure of the pressurized liquid acts on the other side against the core, which can bend away from the roller gap under the action of this pressure. This deflection is possible because of the space between the hollow cylinder and the core without interfering with the rotation of the hollow cylinder about the core. The forces required in the gap between the rollers are supplied by the deflection of the core without the hollow cylinder itself being bent.

Other design variations of the cylinders under discussion have sliding shoes which bear against the inner circumference of the hollow cylinder and are acted upon by cylinder/piston units provided in or at the core.

The sliding seals of the longitudinal chamber must seal against the inner circumference of the hollow cylinder, which rotates, in part, with very high velocity. While the necessary pressure in the longitudinal chamber can be adjusted without problems, the escape of small amounts of the pressure liquid under the longitudinal seals into a chamber away from the longitudinal chamber, is basically unavoidable. A certain amount of this oil collects in the course of the operation and must be discharged.

The hollow cylinder is supported at its ends on the core, usually by antifriction bearings. These antifriction bearings require lubrication, for which purpose the pressure oil serving as the pressure liquid is used. Overall, a certain amount of oil accumulates at the end of the hollow cylinder, which must be prevented from escaping from the hollow cylinder or must be drained off only through lines provided for that purpose. In order to accomplish this, an annular enclosure terminating cover is provided at the end of the hollow cylinder; it is operatively tightly connected at its outer circumference to the hollow cylinder and at its inner circumference to the core or the stationary roll stand.

The terminating cover often has, in addition, a regular function as a housing, namely, in case where the flection controlled cylinder is driven. The drive shaft is supported in or at the stationary core, goes through the support point of the core in the roll stand and transmits its motion via gearing arranged on the inside of the roll stand to the hollow cylinder. These gears run in oil, of course, and must be enclosed by a kind of housing, which purpose is served in those designs by the "terminating cover," which then is designed more like a housing. Examples for designs of this type are found in DE-OS No. 27 20 219, DE-PS No. 23 07 772 and U.S. Pat. Nos. 3,290,897; 3,402,679; 3,419,890 and 3,855,681.

At least one of the sealing arrangements provided at the termination cover must be a rotary seal, which permits the relative rotation between the core and the hollow cylinder. Because of the high relative velocities at the sealing point, which can be up to 1,000 m/min, only very high quality seals can be used. These are, in most cases, radially mounted lip seals which consist of plastic material and the lips of which are kept in contact with the counter surface by a coil spring which extends over the circumference and is pre-tightened in tension. While these seals, under ideal conditions, have a good sealing effect and at the same a long service life, these properties are degraded, for instance, if the seal and the counter surface are not exactly coaxial.

This case, however, occurs frequently in the rolls of the type under discussion. This is due to the deflection of the case which takes place in operation. At its end, the hollow cylinder is supported via the antifriction bearings on the core and therefore occupies a definite position relative to the core at the height of the antifriction bearing. The sealing arrangement at the one peripheral rim of the terminating cover cooperating with the hollow cylinder engages at this point. At the other peripheral rim of the terminating cover, however, it cooperates with the core or the roll stand with some spacing in the axial direction. If the core is bent, a dislocation of least one of the sealing arrangements at the two peripheral rims of the terminating cover therefore comes about. While the mentioned lips seals can compensate for small dislocations (which is the very reason for their suitability for such sealing purposes), such seals are not equipped for larger dislocations. It has been found in practice that with large cylinders of the type under discussion, radial dislocations in the order of up to 2 mm at the seal can definitely be expected.

In a floating cylinder, in which the terminating cover is arranged fixed on the core and the lip seal is provided at the outer peripheral rim of the terminating cover, it has already been undertaken to arrange the lip seal in the terminating cover eccentrically to its axis. The eccentricity is chosen so that it corresponds to the deflection of the core expected under the normal operating load of the cylinder, or to the radial dislocation at the height of the seal. Under this definite load, the seal can then run without deformation under ideal conditions. However, as soon as the load changes relative to the value on which the calculated eccentricity is based, the conditions are no longer ideal in this case either.

SUMMARY OF THE INVENTION

It is an object of the present invention to develop a cylinder of the type discussed above, in such a manner that sealing of the cylinder is permanently assured under any loads and deflections of the core that occur.

The solution of this problem according to the present invention is accomplished by using a terminating cover enclosing the sealing arrangements which is capable of compensating displacement occuring when the core is bent.

The assembly consisting of the terminating cover and the sealing arrangements is therefore designed so that it can follow the occurring displacements without chnges occurring in the seal itself which could affect the sealing function adversely, such as would be the case, for instance, if the lip seal and the counter surface were arranged eccentrically. As a result, the sealing function is always the same, regardless of the load on the hollow cylinder.

The capability of the terminating cover to compensate cannot be achieved by its deformation as a whole, for instance, if it is made of resilient plastic. If the cover were made sufficiently soft, in order to keep the displacement forces at the seals small, then its dimensional stiffness would no longer be great enough to intercept the rotary friction forces transmitted by the rotary seals without vibration. The terminating cover must therefore be a part which is rigid in itself, at least in the circumferential direction.

The most important application of the present invention concerns an embodiment with a rotary seal which is put in place radially, be it on a circumferential surface connected to the hollow cylinder, or be it on a circumferential surface connected to the core or the roll stand.

In one such embodiment, the rotary seal which is seated radially is provided and adjacent to the rotary seal, a rotary bearing holding the rotary seal at a predetermined distance from the sliding surface is disposed. The terminating cover comprises two mutually sealed parts which are separated from each other in the circumferential direction, and which are not rotatable but can be displaced relative to each other. It is essential here that the terminating cover is movable in itself, while the two sealing arrangements remain geometrically uninfluenced by the dislocations.

According to a further feature of the present invention, the rotary bearing arranged next to the rotary seal can be a bronze ring bearing. Such a bearing can stand high relative velocities because it runs on a hydrodynamic oil film, and can furthermore be realized with larger diameter in a space saving design.

The terminating cover frequently comprises a section substantially parallel to the axis as well as a substantially radial section. The section parallel to the axis is in operative connection with the end of the hollow shaft on one side, while the radial section leads toward the core and is secured or sealed there.

It has been found advantageous to provide for the separation of the terminating cover into two parts in the region of the radial section. This is compatible with the fact that the displacements caused by the deflection of the core extend likewise predominantly in the radial direction.

While embodiments in which a radially mounted rotary seal is provided which is protected by an additional rotary bearing against lateral displacement of its counter surface, whereby the radial resiliency must take place in the terminating cover and an axial sliding ring seal is provided in the terminating cover, an embodiment is also possible in which such a seal does not change its operation if the sliding ring is displaced on the sliding surface in the radial direction. The necessary capability for compensating is therefore provided here by the seal itself.

While in principle it is also possible to provide the sliding ring seal at the hollow cylinder, an embodiment in which the sliding ring seal is mounted at the inner opening of the terminating cover is preferred, if only for the reason that the relative velocities are lower at this point.

BRIEF DESCRIPTION OF THE DRAWINGS

FIGS. 2 to 5 are schematic partial longitudinal sections through the region of the terminating cover for different embodiments of the present invention.

DETAILED DESCRIPTION OF THE INVENTION

Figure 1:
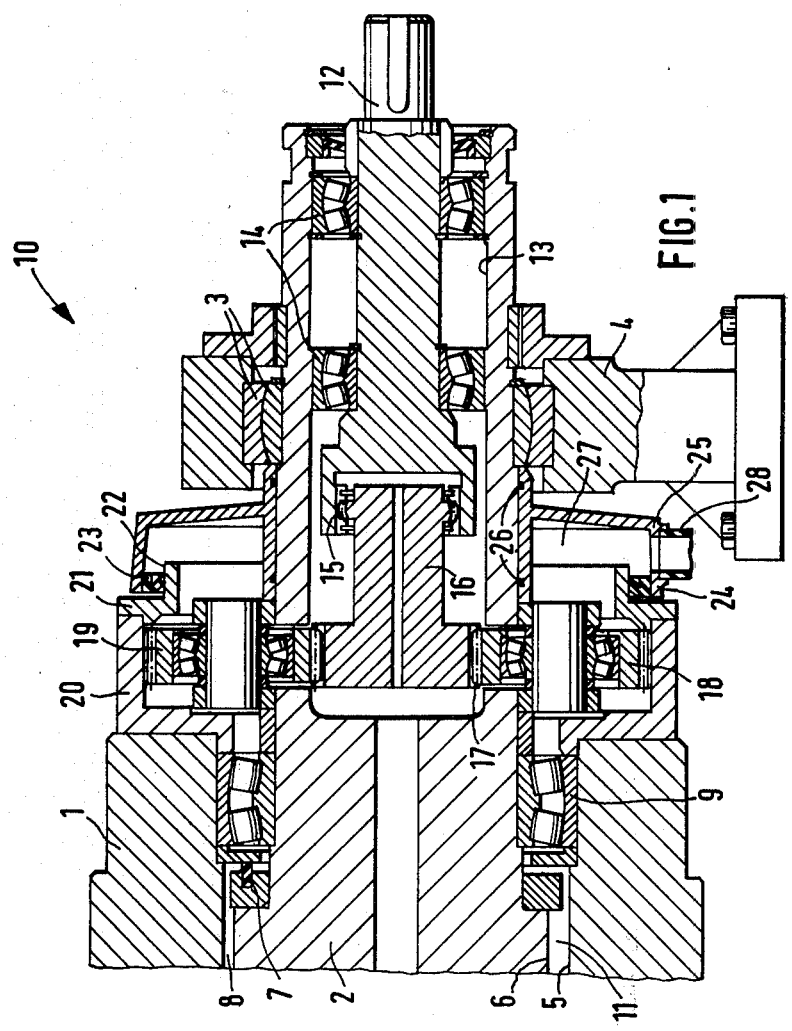
FIG. 1 shows a longitudinal section through the end of a so-called floating cylinder with a drive, which has a seal in accordance with the state of the art obtained by means of a terminating cover.

In FIG. 1, a floating cylinder 10 is shown, which comprises a revolving hollow cylinder 1. The gap between the opposing rolls is located at the top, according to FIG. 1. Extending through the hollow cylinder 1 is a stationary core 2, which protrudes from the ends of the hollow cylinder 1 on both sides and is supported there, in a roll stand 4 via a spherical support 3 which permits a deflection of the core 2. The inside circumference 5 of the hollow cylinder 1 is spaced from the outside circumference 6 of the core, so that the core 2 can bend by a certain amount in the hollow cylinder 1 without touching the inside circumference 5 and impeding the rotation of the hollow cylinder 1.

The space between the core 2 and the hollow cylinder 1 is divided by longitudinal seals which are fastened to the core 2 at about half-height but are not shown, and by transversal seals 7 provided at the ends, whereby a longitudinal chamber 8 on the side of the roll gap is formed which can be filled with pressurized oil of controllable pressure. In the longitudinal chamber 8, the pressurized oil is in direct contact with the inside circumference 5 of the hollow cylinder 1 and transmits its pressure to the cylinder 1. On the other side, the pressurized oil bears against the core 2, which takes up these counter forces, while being deflected. The hollow cylinder 1 can therefore exert a line pressure in the gap between the rolls without being flexed itself. It is relieved from being bent by the core 2.

At the ends, the hollow cylinder 1 is supported on the core 2 via antifriction bearings 9. This bracing makes it possible to even control the bending of the hollow cylinder 1 or the distribution of the line pressure in a definite manner via the pressure in the longitudinal chamber 8.

The longitudinal chamber 8 is not sealed completely hermetically by the longitudinal seals and the transversal seals 7, but a certain amount of leakage oil escapes of necessity under the longitudinal seals; this leakage oil accumulates in the opposite chamber 11, from where it passes through the bearings 9 in the manner shown in FIG. 1 and takes over the lubrication of the latter.

The hollow cylinder 1 can be driven by a shaft stub 12, which is supported in an axial recess 13 of the core 2 coaxially thereto on bearings 14. At the end engaging the recess 13, the drive stub 12 has an internal circular tooth arrangement 15 which engages a corresponding external circular tooth arrangement of a sun wheel 16 which is arranged on the same axis as the shaft stub 12 and has a spur gear arrangement 17 at the end pointing into the recess 13. The sun wheel 16 is not supported in bearings. It cooperates with planetary gears 18 and 19 which are supported on the core and in turn mesh with internal gearing in a drive bushing 20 which is firmly connected to the end of the hollow cylinder.

At the face end of the drive bushing 20, a ring 21 is provided which has a circumferential surface 22 on which a lip seal ring 23 is placed radially from the outside, which is attached at the outer rim 24 of a terminating cover 25. The terminating cover 25 is mounted directly on the core 2 and is sealed against the latter by means of O-rings 26.

The oil coming from the chamber 11 therefore enters, after passing through the bearings 9, the interior 27 of the terminating cover 25 containing the gear arrangement 16, 18, 19, and 20 and fills the former for lubricating the gear arrangement. The oil is continuously drained from an outlet 28; a predetermined pressure can be maintained in the interior 27.

The problem is the sealing arrangement 22, 23. If a line pressure occurs on the working side of the hollow cylinder 1, the core 2 is bent downward, according to FIG. 1, so that it is subjected at the height of the spherical bearing elements 3 to a chamber in the angle ot the left and down, which is taken up by the spherical surface. The terminating cover 25 is secured on the core 2 in the vicinity of the spherical bearing elements 3 and therefore substantially retains its height position, according to FIG. 1. The hollow cylinder 1, which remains substantially straight, is supported on the core 2 via the anti-friction bearings 9, the point of support being displaced downward due to the flexing of the core 2. The counter surface 22 of the lip sealing ring 23, connected to the hollow cylinder 1, is therefore displaced downward, so that the lip sealing ring 23 is compressed at the bottom and gets more clearance at the top. Of course, this degrades the seal, and the lip sealing ring 23 also wears out faster due to the increased stress in the lower region. The lip sealing ring 23 can be built into the terminating cover 25 already displaced downward, so that it is stressed uniformly if the core 2 is bent an amount corresponding to a given load on the hollow cylinder. If the load deviates from the predetermined load, however, the problems of non-uniform stress of the lip sealing ring arise again.

In FIG. 2, a cylinder 100 is shown, in which these problems are eliminated. The drive bushing 12, which has at its protruding end a circumferential surface 122 forming the sliding surface for the lip sealing ring 23, is firmly joined to the hollow cylinder 1. The lip sealing ring is mounted in the axial part 130 of a terminating cover 125 in the vicinity of its rim facing the hollow cylinder 1. The terminating cover 125 as a whole is approximately cup-shaped, the bottom forming a radial part 131 extending toward the core 2. In the area of this radial part 131, the terminating cover 125 is divided into two separate parts 125' and 125'', of which part 125'' is arranged fixed and tight on the shaft 2 and part 125' can move in a slot 132 formed in the part 125''0 in the direction of the arrow 133. Part 125' is guided in the slot 132 and is sealed by O-rings 134.

on the inside of the lip sealing ring 23 a rotary bearing 135 is arranged in the terminating cover 125 on the part 125' thereof, respectively, which comprises an outer bearing ring 136 mounted in the part 125' as well as a part 137 which is seated on the drive bushing 120. The parts 136 and 137 make contact with each other via a spherical surface 138, on which an oil film is maintained, on which the rings can slide on each other in the circumferential direction.

The essential purpose of the rotary bearing 135 is to substantially maintain the distance 29 between the counter surfaces of thee lip sealing ring 23, in order to preserve uniform loading of the lip sealing ring 23.

If the core is bent and the sliding surface 122 of the lip sealing ring 23 is displaced downward, the rotary bearing 135 carries along the part 125' of the terminating cover 125 downward in the direction of the arrow 133, so that the lip sealing ring 23 is not substantially affected thereby. While the deflection of the core 2 does cause an angle change, whereby part 125'' of the terminating cover 125 is positioned downward to the left, according to FIG. 2, the counter surface 122 together with the hollow cylinder 1 remains substantially straight. The angular change between the parts 125' and 122 is taken up by the spherical surface 138. A mean value is chosen as the radius of the sphere, which is in the range of the most frequently occurring bending radii. The slight axial displacement of part 125' relative to the drive bushing 120 can be compensated by a corresonding axial shift of the part 136 of the rotary bearing 135, since part 137 need not be mounted firmly on the drive bushing 120 because it has no sealing function. The slight compression of the lip sealing ring 23 caused by the angular change in the upper region does not matter but is within the range of the tolerances which the lip sealing ring is able to take up in normal operation. These changes of the distance 29 are several orders of magnitude below the displacements which would occur at this point without the rotary bearing 135 and the internal resiliency of the terminating cover 125.

In FIG. 3, a cylinder 200 is shown which does not comprise a drive or a drive bushing. In this embodiment lip sealing ring 23 rather sits on a sliding surface 222 which forms the sliding surface and is provided directly at the circumference of the hollow cylinder 1. The lip sealing ring 23 is secured in the axial part 130 of a terminating cover 225 and consists, similarly as in the case of the cylinder, of two parts 225' and 225'' which can move radially relative to each other. On the inside of the lip sealing ring 23, a rotary bearing 235 is also provided here in the form of a bronze ring which maintains the radial distance between the sliding surface 222 and the inside circumference of the axial part of the terminating cover 225. In the region of the radial part 131, the radial part of the part 225' is guided in a radial slot 132 of the part 225'' of the terminating cover 225; the sealing is again accomplished by an O-ring 134.

In contrast to the cylinder 200, however, the part 225'' of the terminating cover 225 is not secured on the core, but is bolted directly to the stationary roll stand 4. The interior is sealed against the roll stand 4 via a seal 201.

If the core 2 bends downward, the hollow cylinder 1 is also displaced downward, according to FIG. 3, and takes along part 225' of the terminating cover 225, which moves downward in the slot 132. Problems with changes of the angle do not occur because the cylinder is generally controlled so that it stays straight, i.e., does not change its orientation relative to part 225''. Thus, only a linear displacement of part 225' takes place. For this reason, the rotary bearing 235 also need not be provided with a spherical surface, but it can work with a simple cylindrical sliding surface.

In the cylinder 300 of FIg. 4, the part 325' of the terminating cover 325, is firmly connected to the hollow cylinder 1 or to a drive bushing 320 connected thereto, respectively. In the radial part 131 of the terminating cover 325, its parts 325' and 325'' have a space 301 between each other, which is bridged by annular bellows 302 and is closed off tightly. The bellows 302 are secured in a suitable manner with their edges at the edges of the parts 325', and 325" and allow a displacement of the parts 325' and 325" relative to each other in the radial and also axial direction. At the same time, however, the bellows 302 are capable of transmitting forces large enough so that they can carry part 325" along when they rotate. The lip sealing ring 23 which in the case of the cylinder 300 is arranged in the inner part 325", sits on the core 2 on the sliding surface 322. Next to it, a ball bearing 303 is arranged which maintains the radial spacing between the inside circumference of the part 325" and the outer circumference of the core. If the parts 325' and 325" are displaced relative to each other, the deformation forces of the bellows 302 are thus intercepted by the ball bearing 303, and the lip sealing ring 23 remains unaffected thereby.

In the cylinder 400 according to FIG. 5, the terminating cover 425 is directly connected to the drive bushing 420 of the hollow cylinder 1 and is no longer divided, contrary to the embodiments described above. The necessary resiliency is rather achieved by the rotary bearing 435, which is designed as an axial sliding ring bearing. The sliding ring 401 is supportd, for instance, by a closed flexible tube 402 which extends over the circumference and is arranged in an axial slot 403 of a support ring 404 which is seated on the core 2. The sliding ring 401 runs against a counter ring 405 which is supported at the inner rim, facing the core 2, of the terminating cover 425. The revolving terminating cover 425 with the counter ring therefore slides on the nonrotatable sliding ring 401, which, however, is resiliently braced against the flexible tube 402. If the terminating cover 425 is displaced radially relative to the core 2, only the radial position of the overlapping areas of the rings 401 and 405 changes, but not the sealing action. It is understood that play corresponding to the maximally occurring radial displacements is left between the outer parts of the terminating cover 425 and the core or the parts 404 etc. fastened thereto, respectively. Slight axial displacements accompanying the radial displacements are taken up by the elasticity of the flexible tube 402.

It is understood that other known designs of sliding ring seals can also be employed instead of the designs shown.

What is claimed is:

1. In a deflection controlled cylinder having a hollow cylinder which forms the working cylinder circumference and through which a stationary core extends lengthwise, leaving space all around from the inside circumference of the hollow cylinder, with means dividing the space between said core and said hollow cylinder into at least two longitudinal chambers, one on the side of the cylinder at which a roll gap will be established, said hollow cylinder being supported on the core with spacing by bearings at the end of the core, and being supported between the bearings against the core by the working pressure of a pressure medium supplied to said longitudinal chamber adjacent the roll gap, said controlled cylinder having at least one terminating cover which is provided at one end of the hollow cylinder, surrounds the core in ring fashion and is sealed by a sealing arrangement to prevent the escape of oil from the end of the cylinder at its outside and inside circumference, the improvement comprising, said sealing arrangement including a rotary seal which is radially seated and a rotary bearing holding said rotary seal at a predetermined distance from the sliding surface to compensate for displacement occurring when the core is bent, said rotary seal and rotary bearing disposed within the terminating cover enclosing the sealing arrangement.

2. The improvement according to claim 1 wherein said terminating cover comprises one and another mutually sealed parts which are separated from each other in the circumferential direction, and which are not rotatable but can be displaced relative to each other.

3. The improvement according to claim 2, wherein said the rotary bearing is a bronze ring bearing.

4. The improvement according to claim 2 wherein said terminating cover comprises a section which is substantially parallel to the axis as well as a substantially radial section, and wherein said separation is provided in the region of the radial section.

5. The improvement according to claim 2, wherein said rotary seal is arranged in said one part of the terminating cover and is seated radially on a radial extension of the hollow cylinder, and wherein said other part of the terminating cover is fixed on the core.

6. The improvement according to claim 2, wherein said rotary seal is arranged on said one part of the terminating cover and is seated radially on an axial part of the hollow cylinder and said other part of the terminating cover is firmly connected to the support of the core.

7. The improvement according to claim 2, wherein said rotary seal is arranged in said other part of the terminating cover and is seated radially on the core and said one part of the terminating cover is firmly connected to the hollow cylinder.

8. The improvement according to claim 2, wherein a terminating part forms a circumferential slot, with which the other part engages substantially radially, leaving radial play.

9. The improvement according to claim 2, wherein said parts are connected together at the separation point by annular bellows.

10. In a deflection controlled cylinder having a hollow cylinder which forms the working cylinder circumference and through which a stationary core extends lengthwise, leaving space all around from the inside circumference of the hollow cylinder, with means dividing the space between said core and said hollow cylinder into at least two longitudinal chambers, one on the side of the cylinder at which a roll gap will be established, said hollow cylinder being supported on the core with spacing by bearings at the end of the core, and being supported between the bearings against the core by the working pressure of a pressure medium supplied to said longitudinal chamber adjacent the roll gap, said controlled cylinder having at least one terminating cover which is provided at one end of the hollow cylinder, surrounds the core in ring fashion and is sealed by a sealing arrangement to prevent the escape of oil from the end of the cylinder at its outside and inside circumference, the improvement comprising the sealing arrangement comprising an axial sliding ring seal made up of sliding first and second sliding rings coupled respectively to the cylinder and cover and a rotary bearing holding said sliding rings in contact, to compensate for displacements occurring when the core is bent.

11. The improvement according to claim 10, wherein said terminating cover is firmly connected to the hollow cylinder and said sliding ring seal is provided at the inner opening of the terminating cover.

* * * * *